United States Patent
Noren et al.

(10) Patent No.: US 6,391,936 B1
(45) Date of Patent: May 21, 2002

(54) RADIATION-CURABLE OLIGOMERS RADIATION-CURABLE COMPOSITIONS, COATED OPTICAL GLASS FIBERS, AND RIBBON ASSEMBLIES

(75) Inventors: Gerry K. Noren, Algonquin; Eva Montgomery, Woodstock, both of IL (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 08/996,186

(22) Filed: Dec. 22, 1997

(51) Int. Cl.$^7$ .............................. C08F 2/46; C08L 75/06
(52) U.S. Cl. .......................................... 522/93; 525/455
(58) Field of Search .............................. 522/93; 525/455

(56) References Cited

U.S. PATENT DOCUMENTS

| | | | |
|---|---|---|---|
| 4,496,210 A | | 1/1985 | Ansel |
| 4,608,331 A | * | 8/1986 | Bernstein et al. |
| 4,624,994 A | | 11/1986 | Ansel |
| 4,629,285 A | | 12/1986 | Carter |
| 4,660,927 A | | 4/1987 | Kondow |
| 4,668,763 A | * | 5/1987 | Müller et al. |
| 4,682,851 A | | 7/1987 | Ansel |
| 4,782,129 A | | 11/1988 | Moschovis |
| 4,794,133 A | | 12/1988 | Moschovis |
| 4,806,574 A | | 2/1989 | Krajewski |
| 4,820,745 A | * | 4/1989 | Müller et al. |
| 4,844,604 A | | 7/1989 | Bishop |
| 4,849,462 A | | 7/1989 | Bishop |
| 4,900,126 A | | 2/1990 | Jackson |
| 4,906,067 A | | 3/1990 | Mayr |
| 4,953,945 A | | 9/1990 | Nishimura |
| 5,011,260 A | | 4/1991 | Marx |
| 5,146,531 A | | 9/1992 | Shustack |
| 5,219,896 A | | 6/1993 | Coady |
| 5,229,433 A | | 7/1993 | Schunck et al. |
| 5,259,060 A | | 11/1993 | Edward |
| 5,336,563 A | | 8/1994 | Coady |
| 5,373,578 A | | 12/1994 | Parker |
| 5,416,880 A | | 5/1995 | Edwards et al. |
| 5,461,691 A | | 10/1995 | Schunck et al. |
| 5,524,164 A | | 6/1996 | Hattori |
| 5,527,835 A | | 6/1996 | Shustack |
| 5,539,849 A | | 7/1996 | Petisce |
| 5,561,730 A | | 10/1996 | Lochkovic |
| 5,621,838 A | | 4/1997 | Nomura |
| 5,736,090 A | * | 4/1998 | Yamamoto et al. ......... 525/455 |

FOREIGN PATENT DOCUMENTS

| | | |
|---|---|---|
| DE | 38 40 644 A1 | 7/1990 |
| EP | 0194 891 A1 | 9/1986 |
| EP | 0 262 340 A2 | 4/1988 |
| EP | 0 345 968 A2 | 12/1989 |
| EP | 0 407 004 A2 | 1/1991 |
| EP | 0 527 266 A1 | 2/1993 |
| EP | 0 539 030 A1 | 4/1993 |
| EP | 0 565 798 A1 | 10/1993 |
| EP | 0 614 099 A2 | 9/1994 |
| EP | 0 699 933 A2 | 3/1996 |
| EP | 0 753 777 A2 | 1/1997 |
| EP | 0 780 712 A2 | 6/1997 |
| FR | 2 672 699 A1 | 8/1992 |
| GB | 2 259 704 A1 | 3/1993 |
| JP | A-01152114 | 6/1989 |
| JP | 62-311609 | 6/1989 |
| JP | H3-35210 | 2/1991 |
| JP | A-04296315 | 10/1992 |
| NZ | 242146 | 7/1995 |
| WO | WO 90/13579 A1 | 11/1990 |
| WO | WO 93/21248 | 10/1993 |
| WO | WO 96/02596 | 2/1996 |
| WO | WO 96/11217 | 4/1996 |
| WO | WO 96/11965 | 4/1996 |
| WO | WO 97/05515 A1 | 2/1997 |
| WO | WO 97/16469 A1 | 5/1997 |
| WO | WO 97/18493 A1 | 5/1997 |
| WO | WO 97/19029 A1 | 5/1997 |

OTHER PUBLICATIONS

K.W. Jackson, et. al., "The Effect of Fiber Ribbon Component Materials on Mechanical and Environmental Performance", 28 International Wire & Symposium Proceedings (1993).

H.C. Chandon, et. al., "Fiber Protective Design for Evolving Telecommunication Applications", International Wire & Symposium Proceedings (1992).

J.R. Toler, et. al., "Factors Affecting Mechanical Stripping of Polymer Coatings From Optical Fibers", International Wire & Cable Symposium Proceedings (1989).

W. Griffioen, "Strippability of Optical Fibers", EFOC & N, Eleventh Annual Conference, Hague (1993).

* cited by examiner

Primary Examiner—Tae H. Yoon
(74) Attorney, Agent, or Firm—Jeffrey S. Melcher; Manelli Denison & Selter, PLLC

(57) ABSTRACT

Provided is a radiation-curable, inner primary coating composition adapted for forming inner primary coatings on optical glass fibers. The coating composition is formulated from a composition having:

at least one radiation-curable oligomer having a number average molecular weight of at least 2000 containing:
a polyester backbone;
a plurality of carbon-containing side-chains each having from about 3 to about 30 carbon atoms and being connected to the polyester backbone, wherein the carbon-containing side-chains comprise at least about 5% of the number average molecular weight of the oligomer; and
at least one radiation-curable functional group bound to the polyester backbone, wherein the oligomer is present in an amount sufficient to provide an inner primary coating formed from the coating composition with the functional capability of releasing from a surface of an optical glass fiber as a coherent layer; and optionally at least one diluent monomer in an amount to provide the coating composition with a viscosity suitable for application to optical glass fibers.

47 Claims, 1 Drawing Sheet

RADIATION-CURABLE OLIGOMERS RADIATION-CURABLE COMPOSITIONS, COATED OPTICAL GLASS FIBERS, AND RIBBON ASSEMBLIES

BACKGROUND OF THE INVENTION

1. Field of the Invention

The invention relates to radiation-curable oligomers, radiation-curable compositions, coated optical glass fibers, and ribbon assemblies.

2. Description of Related Art

Optical glass fibers are generally coated with two superposed radiation-cured coatings, which together form a primary coating. The coating which is in direct contact with the glass is called the inner primary coating and the overlaying coating(s) is called the outer primary coating.

The inner primary coating is usually a relatively soft coating providing environmental protection to the glass fiber and resistance, inter alia, to the well-known phenomenon of microbending. Microbending in the coated fiber can lead to attenuation of the signal transmission capability of the coated fiber and is therefore undesirable. The outer primary coating(s), which is on the exposed surface of the coated fiber, is typically a relatively harder coating designed to provide a desired resistance to physical handling forces, such as those encountered when the fiber is cabled.

For the purpose of multi-channel transmission, optical glass fiber assemblies containing a plurality of coated optical fibers have been used. Examples of optical glass fiber assemblies include ribbon assemblies and cables. A typical ribbon assembly is made by bonding together a plurality of parallel oriented, individually coated optical glass fibers with a matrix material. The matrix material has the function of holding the individual optical glass fibers in alignment and protecting the same during handling and the installation environment. Often, the fibers are arranged in ribbon structures, having a generally flat, strand like structure containing generally from about 2 to 24 fibers. Depending upon the application, a plurality of resulting ribbon assemblies can be combined into a cable which has from several up to about one thousand individually coated optical glass fibers. An example of a ribbon assembly is described in published European patent application No. 194891. In general, a plurality of ribbon assemblies may then be combined together in a cable, as disclosed in U.S. Pat. No. 4,906,067.

Optical glass fiber assemblies provide a modular design which simplifies the construction, installation and maintenance of optical glass fibers by eliminating the need to handle individual optical glass fibers.

Coated optical glass fibers for use in optical glass fiber assemblies are usually coated with an outer colored layer, called an ink coating, or alternatively a colorant is added to the outer primary coating to facilitate identification of the individual coated optical glass fibers. Thus, the matrix material which binds the coated optical glass fibers together contacts the outer ink layer if present, or the colored outer primary coating.

When a single optical glass fiber of the assembly is to be fusion connected with another optical glass fiber or with a connector, an end part of the matrix layer can be removed to separate each of the optical glass fibers. Desirably, the primary coatings on the coated optical glass fibers, and the ink coating if present, are removed simultaneously with the matrix material to provide bare portions on the surface of the optical glass fibers (hereinafter referred to as "ribbon stripping"). In ribbon stripping, the matrix material, primary coatings, and ink coating, are desirably removed as a cohesive unit to provide a clean, bare optical glass fiber which is substantially free of residue. This residue can interfere with the optical glass fiber ribbon mass fusion splicing operation, and therefore usually must be removed by wiping prior to splicing. The step of removing the residue can cause abrasion sites on the bare optical glass fiber, thus compromising the strength of the connection. Furthermore, these abrasion sites can lead to unwanted microbending. The ability of ribbon assemblies to provide clean, residue-free, bare optical glass fibers during ribbon stripping is highly desired.

A common method for practicing ribbon stripping at a terminus of the ribbon assembly is to use a heated stripping tool. Such a tool consists of two plates provided with heating means for heating the plates to about 90 to about 120° C. An end section of the ribbon assembly is pinched between the two heated plates and the heat of the tool softens the matrix material and the primary coatings on the individual optical glass fiber. The heat-softened matrix material and heat-softened primary coatings present on the individual optical glass fibers can then be removed to provide bare optical glass fiber ends, at which the fusion connections can be made. A knife cut is often used to initiate a break in the matrix material to the inner primary coating. Typically, only about 1 cm to about 4 cm section of the matrix material and coatings on the optical glass fibers need be removed so that identification of the bare individual optical glass fibers can be made by tracing back along the bare optical fiber until the ink coating or colored outer primary coating is seen.

U.S. Pat. No. 5,373,578 discloses a ribbon assembly containing a plurality of coated optical glass fibers. Each of the optical glass fibers is coated with an inner primary coating which is adjacent to the optical glass fiber, with an outer primary coating and ink coating on the outer primary coating. The inner primary coating is modified so that adhesion between the inner primary coating and the optical glass fiber is reduced. This reduction in adhesion facilitates easy removal of the heat-softened primary coating when using a heat stripping method. While this patent discloses, at column 5, lines 10–13, that the adhesion between the inner primary coating and the optical glass fiber should be sufficient to prevent delamination of the inner primary coating from the optical glass fiber, any reduction in the adhesion between the inner primary coating and the optical glass fiber increases the possibility of such undesirable delamination in the presence of moisture. Delamination of the inner primary coating from the optical glass fiber can lead to strength degradation of the optical glass fiber and attenuation of the signal transmitted through the optical glass fiber.

Published European patent application 0262340 discloses a ribbon cable having a "peel layer" as the outermost coating layer on each of optical glass fibers contained within the ribbon cable. During ribbon stripping, the peel layer is destroyed and the matrix material is removed from the coated optical glass fibers. However, after ribbon stripping, the optical glass fibers are still coated with the primary coatings. The primary coatings are not simultaneously removed with the matrix material in the ribbon assemblies disclosed in this publication.

U.S. Pat. No. 5,011,260 discloses a ribbon cable having a "decoupling layer" disposed between the coated optical glass fibers and the matrix material. In this manner, the matrix material may be easily removed from the coated optical glass fibers by application of low stripping force. This patent discloses a general statement that the coatings on the optical glass fiber can be simultaneously removed with the matrix material during ribbon stripping. However, this patent does not teach how to solve the problems associated with residue remaining on the bare optical glass fibers after ribbon stripping conventional ribbon assemblies.

Published European patent application 0407004 discloses a ribbon cable containing a matrix material having sufficient adhesion to the ink coated optical glass fibers to remain thereto during normal use but is easily strippable there from without damaging the integrity of the ink layer on the coated optical glass fibers. Thus, the ribbon assembly disclosed in this publication does not have the capability of removing the primary coatings on the optical glass fibers simultaneously with the matrix material during ribbon stripping, and to provide residue-free bare optical glass fibers.

Published European patent application 0527266 discloses a ribbon cable containing a lubricating "interfacial layer" which separates the matrix material from the coated optical glass fibers. The interfacial layer facilitates easy removal of the matrix material from the coated optical glass fibers. While this publication discloses at page 3, line 15, that the buffer layer and first protective coating can be stripped in one step, there is no disclosure teaching how to accomplish such. Furthermore, the lubricating interfacial layer will inhibit simultaneously removal of the first protective coating with the matrix material. Thus, this publication does not teach how to make a ribbon assembly having the capability of removing the primary coatings on the optical glass fibers simultaneously with the matrix material during ribbon stripping, and to provide residue-free bare optical glass fibers.

U.S. Pat. No. 4,900,126 discloses a ribbon cable in which the bonding between the ink layer and the primary coatings on the optical glass fibers is greater than the bonding between the ink layer and the matrix material. In this manner, the matrix material can be easily removed from the ink coated optical glass fibers without removing the ink layer. This patent does not address the problems associated with removing the primary coating layers simultaneously with the matrix material.

U.S. Pat. No. 4,660,927 teaches a silicone-coated optical fiber in which the soft silicone coating is easily peeled from the surface of the optical glass fibers by finger pressure. The coating contains a first siloxane component having aliphatic unsaturated groups and a second siloxane component having mercaptoalkyl groups. Because the coating is easily peelable by rubbing with finger pressure, the coating has insufficient adhesion to the surface of the optical glass fibers to prevent delamination during most uses. Furthermore, this patent does not address the problems of ribbon stripping, but rather only stripping of a single optical glass fiber. It is generally known that three coating systems (inner primary coating, outer primary coating, and ink coating) having acceptable single fiber strippability possess dramatically different levels of strippability in ribbon form.

U.S. Pat. No. 4,496,210 provides a radiation-curable optical fiber coating composition containing a polysiloxane. However, this patent does not address the problems associated with ribbon stripping.

Japanese Patent Application H3-35210 teaches to combine a liquid lubricant, such as liquid silicone oil or liquid aliphatic oil, with a mercaptosilane compound in an inner primary coating composition. During stripping, when the bond between the surface of the optical glass fiber and inner primary coating is broken the liquid lubricant invades the boundary between the surface of the optical glass fiber and the inner primary coating. The liquid lubricant must not have a high compatibility with the inner primary coating or it will not bleed out of the inner primary coating during stripping. However, the use of a liquid silicone oil or liquid aliphatic oil can reduce the stability of the inner primary coating. Furthermore, since the liquid silicone oil and liquid aliphatic oil are not bound within the inner primary coating, they can be extracted from the inner primary coating.

There are many test methods to determine the performance of a ribbon assembly during ribbon stripping. An example of a suitable test method for determining the stripping performance of a ribbon is disclosed in the article by Mills, G., "Testing of 4- and 8-fiber ribbon strippability", 472 International Wire & Cable Symposium Proceedings (1992), the complete disclosure of which is incorporated herein by reference.

Many attempts have been made to understand the problems associated with ribbon stripping and to find a solution to increase ribbon stripping performance. The following publications attempt to explain and solve the problems associated with ribbon stripping: K. W. Jackson, et. al., "The Effect of Fiber Ribbon Component Materials on Mechanical and Environmental Performance", 28 International Wire & Symposium Proceedings (1993); H. C. Chandon, et. al., "Fiber Protective Design for Evolving Telecommunication Applications", International Wire & Symposium Proceedings (1992); J. R. Toler, et. al., "Factors Affecting Mechanical Stripping of Polymer Coatings From Optical Fibers", International Wire & Cable Symposium Proceedings (1989); and W. Griffioen, "Strippability of Optical Fibers", EFOC & N, Eleventh Annual Conference, Hague (1993).

There is a need for a radiation-curable, inner primary coating composition which when suitably cured provides the property of releasing from the surface of an optical glass fiber to provide a clean, bare optical glass fiber, subsequent to ribbon stripping.

SUMMARY OF THE INVENTION

It is an objective of the present invention to provide novel radiation-curable oligomers which when utilized to formulate inner primary coatings on coated optical glass fibers for use in ribbon assemblies, provides the inner primary coating with the inherent property to release as a coherent layer from an optical glass fiber during ribbon stripping to provide a clean, bare optical glass fiber.

Another objective of the present invention is to provide novel radiation-curable inner primary coating compositions which when utilized to formulate inner primary coatings on coated optical glass fibers for use in ribbon assemblies, provides the inner primary coating with the inherent property to release as a coherent layer from an optical glass fiber during ribbon stripping to provide a clean, bare optical glass fiber.

A further objective of the present invention is to provide novel coated optical glass fibers containing an inner primary coating having the inherent property of releasing as a coherent layer from an optical glass fiber during ribbon stripping to provide clean, bare optical glass fibers.

Another objective of the present invention is to provide novel ribbon assemblies containing at least one coated optical glass fiber having an inner primary coating which has the inherent property of releasing as a coherent layer from the optical glass fiber during ribbon stripping to provide a clean, bare optical glass fiber.

Surprisingly, the above objects and other objects can be obtained by utilizing a releasing oligomer according to the present invention.

The present invention provides a novel radiation-curable oligomer having a number average molecular weight of at least about 1,500 comprising:

a polyester backbone;

a plurality of carbon-containing side chains connected to said polyester backbone, wherein said carbon-containing side chains comprise at least about 5% of number average molecular weight of said oligomer; and at least one radiation-curable functional group bound to said polyester backbone.

Preferably, the carbon-containing side chains are located sufficiently near to the ester linkages to provide hydrolytic stability to the polyester backbone.

The present invention also provides a novel radiation-curable oligomer having a number average molecular weight of at least about 1,500 formulated from:

a hydroxy functional compound containing a radiation-curable functional group; and a hydroxy functional carboxylic acid which is branched and/or which contains a non-terminal hydroxy functional group that provides a polyester having carbon-containing side chains upon reaction of the hydroxy functional group to form an ester functional group.

The present invention also provides a novel radiation-curable oligomer formulated from the reactants according to the following formula:

wherein R=a hydroxy functional compound containing a radiation-curable functional group:

I=a polyisocyanate compound:

BHCA=a hydroxy carboxylic acid which is branched and/or which contains a non-terminal hydroxy functional group that provides a carbon-containing side chain bound to the polyester backbone upon reaction of the hydroxy functional group to form an ester group; and A=a polyol;

W=1 to about 20 on average; and

S+V=4 to about 20 on average.

The present invention further provides a novel radiation-curable inner primary coating composition adapted for forming inner primary coatings on optical glass fibers formulated from a composition comprising at least one radiation-curable releasing oligomer.

The invention also provides a novel coated optical glass fiber containing at least one inner primary coating formed from the novel radiation-curable, inner primary coating composition, and a ribbon assembly containing at least one of the coated optical glass fibers.

DETAILED DESCRIPTION OF PREFERRED EMBODIMENTS

The improved radiation-curable inner primary coating composition (hereinafter referred to as "inner primary composition") according to the present invention is capable of providing an inner primary coating having the inherent property of being strippable when utilized in ribbon assemblies, even without the use of conventional release agent additives. In particular, the inner primary composition is adapted to provide a cured inner primary coating having a three dimensional, cross-linked polymeric matrix which exhibits the inherent property of releasing from the optical glass fiber as a coherent inner primary layer. Providing ribbon stripping in this manner is in a direction very different from the use of release agent additives. However, if desired, conventional release agent additives may be added to tailor the properties of the inner primary composition as desired.

The improved inner primary composition of this invention can be based on any known radiation-curable inner primary coating compositions for coating optical glass fibers. In general, conventional radiation-curable inner primary coating compositions contain at least one radiation-curable oligomer. The conventional radiation-curable inner primary coating composition can become the improved inner primary composition according to the present invention by utilizing the novel radiation-curable releasing oligomer. Surprisingly, the releasing oligomer can even be utilized as the main oligomer in the inner primary composition. Alternatively, the improved inner primary composition according to the present invention can be formulated by combining the releasing oligomer with, for example, diluent monomers and other oligomers, as desired.

Examples of suitable radiation-curable compositions which may be reformulated according to the present invention variously include those which are disclosed in U.S. Pat. Nos. 4,624,994; 4,682,851; 4,782,129; 4,794,133; 4,806,574; 4,849,462; 5,219,896; and 5,336,563, all of which are incorporated herein by reference.

The releasing oligomer can be used to provide a balance between (1) the coefficient of friction between the inner primary coating and the surface of the optical glass fiber and (2) the cohesive strength of the inner primary coating such that the inner primary coating separates from a surface of an optical glass fiber and retains integrity during ribbon stripping to provide a coherent layer and a clean, bare optical glass fiber. More particularly, the releasing oligomer can be used to adjust the coefficient of friction between the surface of the optical glass fiber and the inner primary coating to be low enough that the inner primary coating retains its integrity when being forced along the surface of the optical glass fiber during ribbon stripping. In such a manner, the inner primary coating can be removed as a coherent layer. However, if the coefficient of friction is too great, the integrity of the inner primary coating may not be retained and unwanted residue of the inner primary coating may remain on the surface of the optical glass fiber subsequent to ribbon stripping.

The cohesive strength of the inner primary coating is defined herein as the amount of force necessary to destroy the integrity of the inner primary coating. Thus, a higher cohesive strength will require a greater amount of force to destroy the integrity of the inner primary coating. For example, the cohesive strength can be measured using any one of (1) the shear strength of the inner primary coating, (2) the tensile strength of inner primary coating, or (3) the crack propagation of the inner primary coating. Preferably, the cohesive strength is measured using the crack propagation test as described herein below.

If the cohesive strength of the inner primary coating is greater than the force applied during ribbon stripping, the inner primary coating can retain its integrity. The main force applied to the inner primary coating during ribbon stripping is the force caused by friction between the inner primary coating and the surface of the optical glass fiber. In general, the greater the coefficient of friction between the inner primary coating and the surface of the optical glass fiber, the greater the force applied to the inner primary coating during ribbon stripping. If the force from the friction is greater than the cohesive strength of the inner primary coating, the inner primary coating can disintegrate during ribbon stripping leaving unwanted inner primary coating residue on the surface of the optical glass fiber. This residue can interfere with the optical glass fiber ribbon mass fusion splicing operation, and therefore must be removed prior to splicing by wiping. The step of removing the residue can cause abrasion sites on the bare optical glass fiber, thus compromising the strength of the connection and the integrity of the light signal. In particular, the abrasion sites can lead to unwanted microbending. Therefore, the coefficient of friction between the inner primary coating and the optical glass fiber should be made low enough to prevent a force being applied to the inner primary coating that is greater than the cohesive strength of the inner primary coating.

The releasing oligomer is preferably present in an amount which provides the cured inner primary coating with a balance between (1) the coefficient of friction between the inner primary coating and the surface of the optical glass fiber and (2) the cohesive strength of the inner primary coating such that the inner primary coating separates from a surface of an optical glass fiber and retains integrity during ribbon stripping to provide a coherent inner primary layer and a clean, bare optical glass fiber. More particularly, the releasing oligomer is preferably present in an amount in which the coefficient of friction between the cured inner primary coating and the surface of the optical glass fiber results in a force during ribbon stripping which less than the cohesive energy of the inner primary coating.

Based on the disclosure provided herein, one of ordinary skill in the art will easily be able to determine the required amount of releasing oligomer to provide the desired properties in the cured inner primary coating, without undue experimentation. For example, the coefficient of friction can be estimated by using the fiber pull-out friction test described herein below and the cohesive energy of the inner primary coating can be approximated using the crack propagation described herein below. By measuring the crack propagation and fiber pull-out friction of the inner primary coating, one skilled in the art will be able to closely approximate the ribbon stripping properties of the inner primary coating. In general, a crack propagation of at least about 1 mm at a rate of 0.1 mm/second in combination with a fiber pull-out friction of about 30 g/mm at a rate of 0.1 mm/second or less is suitable for many ribbon assembly applications.

Preferably, the releasing oligomer is present in an amount sufficient to provide a fiber pull-out friction between an optical glass fiber and the inner primary coating of about 30 (g/mm) or less, more preferably about 20 (g/mm) or less, and most preferably about 15 (g/mm) or less at a rate of 0.1 mm/sec.

Preferably, the crack propagation is at least about 1 mm, and more preferably at least about 1.3 mm at a rate of 0.1 mm/sec.

The cleanliness of the stripped optical glass fiber after ribbon stripping can be evaluated using the Mill's test described in the background section herein above, the complete disclosure of which is incorporated herein by reference. Thus, the Mill's test can be used to determine the ribbon stripping performance of a ribbon assembly. In general, a value of about 3 or less will usually provide a bare optical glass fiber which is suitable for connection to another optical glass fiber or component of a light transmission assembly, without having to wipe residue from the bare optical glass fiber. Values of about 2 or less are preferred, while values of about 1 are most preferred.

Preferably, the releasing oligomer is present in an amount to provide a cured inner primary coating which when utilized in a ribbon assembly is capable of providing a bare optical glass fiber subsequent to ribbon stripping having a cleanliness of about 3 or less, more preferably about 2 or less, and most preferably about 1, on the Mill's test. Based on experience, it is believed that an inner primary coating having a fiber pull-out friction of about 30 g/mm or less in combination with a crack propagation of at least about 1 mm will provide a bare optical glass fiber having a Mills test of about 3 or less, subsequent to ribbon stripping. Preferably, the releasing oligomer is present in an amount to provide a cured inner primary coating having a fiber pull-out friction of about 30 g/mm or less in combination with a crack propagation of at least about 1 mm, more preferably a fiber pull-out friction of at about 20 g/mm or less in combination with a crack propagation of at least about 1 mm, and most preferably a fiber pull-out friction of at about 15 g/mm or less in combination with a crack propagation of at least about 1 mm.

The releasing oligomer can be used in a significantly broader range of amounts than conventional release agents, such as silicone and fluorine containing release agents. Suitable amounts of the releasing oligomer have been found to be from about 1 to about 99% by weight, preferably about 10 to about 99% by weight, more preferably about 20 to about 99% by weight, based on the total weight of the composition.

In general, the releasing oligomer contains at least one radiation-curable functional group bound to a polyester backbone. The radiation-curable functional group can be for example ethylenic unsaturation, which can be polymerized through radical polymerization orcationic polymerization. Specific examples of suitable ethylenic unsaturation are groups containing acrylate, methacrylate, styrene, vinyl ether, vinyl ester, N-substituted acrylamide, -vinyl amide, maleate esters, and fumarate esters. Preferably, the ethylenic unsaturation is provided by a group containing acrylate, methacrylate, or N-vinyl functionality.

The radiation-curable functional group(s) can be directly bound to the polyester backbone or can be connected to the polyester backbone via a linking group. Examples of suitable linking groups include urethane, urea, and ester groups.

The releasing oligomer usually has a number average molecular weight of from about 1,000 to about 10,000, more preferably 1,500 to about to about 9,000, even more preferably about 2,000 to about 8,500, and most preferably about 2,500 to about 8,000. The polyester usually has about 2 to about 40, preferably about 3 to about 20, and most preferably about 5 to about 15 equivalents of ester groups.

The polyester backbone comprises carbon-containing side chains which are pendent to the polyester backbone chain. Without being bound by any theory, it is believed that the pendent carbon-containing side chains provide the cured inner primary coating with the capability of releasing and sliding along the surface of an optical glass fiber as a coherent layer. In particular, it is believed that the carbon-containing side chains reduce the coefficient of friction between the coating and the surface of the optical glass fiber in combination with providing entanglements and non-bonded associations leading to enhanced cohesion in the inner primary coating. While the entanglements and non-bonded associations provide enhanced cohesion in the inner primary coating, the entanglements and non-bonded associations can be broken during ribbon stripping to provide a clean, bare optical glass fiber.

Preferably, the carbon-containing side chains are located sufficiently near the ester groups that they can stearically hinder chemical attack of the ester functional groups. For example, a carbon-containing side chain can be located on the carbon atom alpha to the ester functional group to provide stearic hindrance. Thus, it has been found that surprisingly the carbon-containing side chains can be utilized for three purposes, (1) to reduce the coefficient of friction between the coating and the coated surface, (2) to increase the cohesive energy of the coating, and (3) to provide hydrolytic stability to the polyester backbone in coating.

The carbon-containing side chains should be present in an amount which provides the releasing oligomer with the capability of reducing the fiber pull-out friction and increasing the crack propagation of the cured inner primary coating. Preferably, at least about 5%, more preferably at least about 10%, and most preferably at least about 15% of the number average molecular weight of the releasing oligomer is comprised of carbon-containing side chains. The amount of carbon-containing side chains should not be so great as to cause unwanted properties, such as too high of a viscosity of the uncured inner primary composition, and too low a modulus and/or tensile strength of the cured inner primary coating. Thus, the portion of the number average molecular weight of the releasing oligomer attributed to the carbon-containing side chains should be less than about 40%, more preferably less than about 30%, and most preferably less than about 20%.

Preferably, the carbon-containing side chains are substantially uniformly spaced apart on the polyester backbone. A particularly preferred structure is a comb-like structure, in which the carbon-containing side chains are like the teeth protruding from the backbone of the comb. However, the side-chains can protrude from the polyester backbone in different directions, as opposed to the two dimensional teeth of a comb.

The carbon-containing side chains are preferably lower alkyls or alkyl substituted aryls having from about 3 to about 30 carbon atoms, preferably about 5 to about 20 carbon atoms, and most preferably about 5 to about 15 carbon atoms. The alkyl and/or alkyl substituted aryl groups may be linear, branched or cyclic as desired. Therefore, propyl, -butyl, i-butyl, 2-ethylbutyl, pentyl, hexyl, heptyl, octyl, nonyl, decyl, undecyl, dodecyl, tetradecyl, propyl phenyl, butyl phenyl, pentyl phenyl, hexyl phenyl, heptyl phenyl, octyl phenyl, nonyl phenyl and the like are suitable. Linear or branched alkyl groups are preferred. When an alkyl substituted aryl is utilized, preferably the alkyl group is para to where the aryl is bound to the polyester backbone. Although not preferred, the carbon-containing side chains can comprise other elements such as nitrogen.

Preferably, at least about 50%, more preferably at least about 70%, even more preferably at least about 90%, and most preferably substantially all of the ester functional groups present in the polyester backbone are stearically hindered by a carbon-containing side chain(s).

The polyester backbone of the releasing oligomer can be formed by any suitable means. Based on the disclosure provided herein, one skilled in the art will be able to provide the desired polyester backbone. For example, the following methods are suitable for making the polyester backbone having carbon-containing side chains.

(1) Hydroxy carboxylic acids and polyols can be reacted to provide a polyester having carbon-containing side chains. The polyol can be branched and/or the hydroxy carboxylic acid can be branched to provide carbon-containing side chains protruding from the polyester backbone. Alternatively, the hydroxy carboxylic acid and/or polyol can contain a non-terminal hydroxy functional group such that upon reaction with a carboxylic acid to form an ester group, a side chain is obtained during formation of the polyester backbone.

(2) Poly carboxylic acids and polyols can be reacted to provide a polyester having carbon-containing side chains. The polyol can be branched and/or the polycarboxylic acid can be branched to provide carbon-containing side chains protruding from the polyester backbone. Alternatively, the polyol can contain a non-terminal hydroxy functional group such that upon reaction with a carboxylic acid to form an ester group, a side chain is formed in the polyester backbone.

The polyester backbone of the releasing oligomer is preferably formed by reacting a suitable hydroxy carboxylic acid with a suitable diol. The term hydroxy carboxylic acid as used herein includes hydroxy carboxylic fatty acids. Preferably, the hydroxy functional carboxylic acids have from about 8 to about 30 carbon atoms, and more preferably from about 10 to about 24 carbon atoms. Examples of suitable hydroxy carboxylic fatty acids include hydroxy caprylic acid, hydroxy capric acid, hydroxy lauric acid, hydroxy myristic acid, hydroxy palmitic acid, hydroxy stearic acid, hydroxy oleic acid, hydroxy linoleic acid, and hydroxy linolenic acid. Specific examples of suitable hydroxy carboxylic acids include 12-hydroxystearic acid, 2-hydroxy-4-methyl valeric acid, 12-hydroxy-4-octyl-dodecanoic acid, δ-dodecanolactone, 19-hydroxy-10-hexyl-nonadecanoic acid, and 16-hydroxy-4-nonyl-11-butyl-hexadecanoic acid. Commercially available examples of suitable hydroxy carboxylic acids include the P-10 acids from CasChem Inc.

The hydroxy carboxylic acid preferably has a structure which results in a polyester having carbon-containing side chains when the hydroxy functional groups are reacted to form ester groups. If branched hydroxy functional carboxylic acids are utilized, the hydroxy functional group can be terminal. However, if linear hydroxy carboxylic acids are utilized, a non-terminal hydroxy functional group should be present so that a carbon-containing side chain bound to the polyester backbone is formed when the hydroxy functional group is reacted to form an ester linkage.

The hydroxy carboxylic fatty acid can contain more than one hydroxy functional group. However, one hydroxy functional group is preferred.

The hydroxy carboxylic acid preferably contains at least one carbon-containing side chain, as shown in the following representative formula (1):

(1)

Where: H=a hydrogen atom;
O=an oxygen atom;
$R_1$, $R_2$, $R_3$, $R_4$, $R_5$, and $R_6$=H or carbon-containing side chains, with the proviso that at least one of $R_1$ through $R_6$ is a carbon-containing side chain, preferably $R_1$ and $R_2$ are not both H; and
X+Y+Z≧3, preferably ≧5, more preferably ≧10.

The carbon-containing side chains should be close enough to the ester group formed by the reaction between the hydroxyl group and carboxylic acid group that the carbon-containing side chain(s) can stearically hinder chemical attack of the ester functional group. For example, ester groups are susceptible to hydrolysis in the presence of moisture. However, it has been found that if the carbon-containing side chains are strategically placed, they can stearically hinder the hydrolysis reaction. Thus, radiation-cured inner primary coatings based on polyesters having stearically hindered ester groups can be inherently more resistant to chemical attack.

Examples of suitable releasing oligomers can be represented by the following non-limiting formulae in which the components are reacted:

(2)

(3)

(4)

where BHCA is a hydroxy carboxylic acid which is branched and/or which contains a non-terminal hydroxy functional group that provides a carbon-containing side chain bound to the polyester backbone upon reaction of the hydroxy functional group to form an ester group;

I is a polyisocyanate compound;
A is a polyol;
P is compound containing at least one hydroxy functional group;
R is a hydroxy functional, radiation-curable compound;
n is from 1 to about 20, preferably about 1 to about 10 on average; and
m is from 1 to about 50, preferably about 1 to about 30, and most preferably about 1 to about 20 on average. The releasing oligomer according to the present invention is not limited by the formulae 2 through 4.

For example, the releasing oligomer may comprise a branched polyester backbone by using a polyol having more than two hydroxy functional groups. However, linear polyester backbones having carbon-containing side chains, as shown in formulae 2 through 4, are preferred. The term "branched polyester" does not include the term "linear polyester having carbon-containing side chains". Only those polyesters that contain side branches composed of complete monomer units are "branched polyesters." The use of the terms "branched" and "side-chains" is as defined in Odian, "Principles of Polymerization", third edition, pgs. 17–19, which pages are incorporated herein by reference.

In the formulae 2 through 4, the isocyanate groups are reacted with the hydroxy functional groups to form urethane linkages. This type of reaction is well known in the art.

The hydroxy carboxylic acids can be polymerized to form the polymeric polyester backbone of the releasing oligomer. Mixtures of hydroxy carboxylic acids can be used to tailor the properties of the polyester as desired. The water formed during formation of the ester groups can be removed via any suitable method, such as by distillation.

After forming the polyester backbone, end terminal hydroxy functional groups of the formed polyester can be reacted with the polyisocyanate and hydroxy functional, radiation-curable compound to form a urethane linkage between the polyester backbone and the radiation-curable functional group. The radiation-curable functional groups can also be bound to the polyester backbone at a location other than the end terminals of the polyester backbone. These types of reactions are well known in the art and therefore one skilled in the art will easily be able to form the desired oligomer based on the disclosure provided herein.

The radiation-curable functional group can be connected to the polyester backbone via any suitable linking group. For example, the polyester backbone can be formed such that carboxylic acid functional groups remain on the polyester backbone. The carboxylic acid functional groups can be reacted directly with the hydroxy functional group of the hydroxy functional, radiation-curable compound to provide an ester linkage between the polyester backbone and the radiation-curable functional group.

Preferably, the radiation-curable functional group is bound directly to the polyester backbone, for example, by reacting acrylic acid or methacrylic acid with an epoxy group present on the polyester backbone. The polymer residue after the reaction is the polyester backbone to which either an acrylate or methacrylate functional group is bound. The general reaction of epoxy groups with acrylic acid and methacrylic acid is well known and therefore one skilled in the art will easily be able to form the desired radiation-curable oligomer based on the disclosure provided herein.

In a first embodiment, "A" can be a polyol, for example, having from about 2 to about 50 carbon atoms, more preferably from about 5 to about 30 carbon atoms. The polyols can be straight chained or branched, as desired. Preferably, the polyol has carbon-containing moieties which are pendent to the carbon(s) which are alpha or beta to the hydroxy functional groups. Examples of suitable carbon-containing moieties are alkyl or aryl groups having from 1 to about 30 carbon atoms, preferably about 1 to about 20 carbon atoms, and most preferably about 1 to about 15 carbon atoms. The alkyl and/or aryl groups may be linear, branched or cyclic as desired. Therefore, methyl, ethyl, n-butyl, i-butyl, n-hexyl, 2-ethylbutyl, phenyl, methylphenyl and the like are suitable. Linear or branched alkyl groups are preferred. More preferably, at least one of the carbon-containing moieties is a carbon-containing side chain as described herein. While diols are preferred, polyols can be used to provide the desired level of branching.

Examples of preferred diols contain the following structure (5):

(5)

Where H=a hydrogen atom;
O=an oxygen atom;
$C_1$=is the carbon atom alpha to the hydroxy functional group;

$C_2$=is the carbon atom beta to the hydroxy functional group; and $R_7$, $R_8$, $R_9$ and $R_{10}$=are each H or carbon-containing moieties, with the proviso that $R_7$, $R_8$, $R_9$ and $R_{10}$ are not all H, and preferably at least one of $R_7$, $R_8$, $R_9$ or $R_{10}$ is a carbon-containing side chain as described herein.

The carbon-containing moieties, $R_7$, $R_8$, $R_9$ and $R_{10}$, can stearically hinder chemical attack of the polyester formed by the reaction between the hydroxy functional group and a carboxylic acid. As discussed previously, ester groups are susceptible to hydrolysis in the presence of moisture. However, the carbon-containing moieties can stearically hinder the hydrolysis reaction. Thus, radiation-cured inner primary coatings based on polyesters having this structure can be inherently more resistant to chemical attack.

A particularly preferred diol is represented by the following formula (6):

(6)

Where H=a hydrogen atom;

O=an oxygen atom;

C=is a carbon atom; and $R_{11}$ and $R_{12}$=are each H or carbon-containing side moieties with the proviso that $R_{11}$ and $R_{12}$ are not both H. Preferably, $R_{11}$ and $R_{12}$ are both alkyls having from about 1 to about 12 carbon atoms, and most preferably about 2 to about 6 carbon atoms. More preferably, at least one of $R_{11}$ or $R_{12}$ is a carbon containing side chain as described herein.

Specific examples of suitable polyols include the following:

2-methyl-1,3-propane diol;
2,2-dimethyl-1,3-propanediol;
2-ethyl-1,3-propanediol;
2,2-diethyl-1,3-propanediol;
2-propyl-2-methyl-1,3-propanediol;
2-propyl-2-ethyl-1,3-propanediol;
2-butyl-2-ethyl-1,3-propanediol,
2-cyclohexyl-2-methyl-1,3-propanediol;
2-phenyl-2-methyl-1,3-propanediol;
1,2-propanediol;
1,4-butanediol;
1,6-hexanediol;
1,2-cyclohexanediol;
1,3-cyclohexanediol;
1,4-cyclohexanediol;
cyclohexyldimethanol;
bis($\alpha,\alpha$-dimethyl-$\beta$-hydroxyethyl)bisphenol-A;
2,2-dimethyl-4,4-dimethyl-1,5-pentanediol;
ethyleneglycol;
diethyleneglycol;
dipropyleneglycol;
polyethyleneglycol;
polypropyleneglycol;
1,9-nonanediol;
the like; and
mixtures thereof.

The polyol "A" is preferably present in a minor amount, compared to the amount hydroxy carboxylic acid. Preferably, the polyol "A" is present in an amount of about 10% by weight or less, more preferably about 7% by weight or less, based on the total weight of reactants used to form the releasing oligomer.

Any organic polyisocyanate alone or in admixture, can be used as the polyisocyanate. Examples of suitable diisocyanates include:

isophorone diisocyanate (IPDI),
toluene diisocyanate (TDI),
tetramethylenexylene diisocyanate (TMXDI),
diphenylmethylene diisocyanate,
hexamethylene diisocyanate,
cyclohexylene diisocyanate,
methylene dicyclohexane diisocyanate,
2,2,4-trimethyl hexamethylene diisocyanate,
m-phenylene diisocyanate,
4-chloro-1,3-phenylene diisocyanate,
4,4'-biphenylene diisocyanate,
1,5-naphthylene diisocyanate,
1,4-tetramethylene diisocyanate,
1,6-hexamethylene diisocyanate,
1,10-decamethylene diisocyanate,
1,4-cyclohexylene diisocyanate, and
polyalkyloxide and polyester glycol diisocyanates such as polytetramethylene ether glycol terminated with TDI and polyethylene adipate terminated with TDI, respectively. Preferably, the polyisocyanate is TDI, IPDI or TMXDI.

Any suitable hydroxy functional, radiation-curable compound can be used. Such compounds having acrylate functional groups include, for example, 2-hydroxyethyl acrylate, 2-hydroxypropyl acrylate, and the like. Compounds having vinyl ether functional groups include, for example, 4-hydroxybutyl vinyl ether, and triethylene glycol monovinyl ether. Compounds having maleate functional groups include, for example, hydroxy functional maleates.

Hydroxy functional compounds providing an epoxy functionality are for example epichlorohydrin that can be reacted with an hydroxy functional group of the oligomer diol, or compounds having one or more epoxy groups and a hydroxy functional group that can be reacted with a polyisocyanate, for example, oligomers of bisphenol-A bis epoxy resins.

Hydroxy functional compounds providing an amine-ene or thiol-ene systems can contain, for example, an allylic unsaturation, or tertiary amine or thiol groups. Thus, the releasing oligomer can be provided with allylic unsaturation by reaction of an isocyanate with trimethylolpropanediallylether, or the releasing oligomer can be provided with an amine functional group by reaction of the isocyanate with amine functional compounds. Such compounds include, for example: the adduct of trimethylolpropane, isophoronediisocyanate and di(m)ethylethanolamine, the adduct of hexanediol, isophorondiisocyanate and dipropylethanol amine, and the adduct of diethylethanolamine, dimethylethanolamine or dipropylethanolamine.

The polyol, polyisocyanate and hydroxy functional radiation-curable compound are preferably reacted in a proportion such that for one equivalent of the hydroxy functional group of the polyol, about 1.1 to about 1.3 equivalents of the isocyanate group contained in the polyisocyanate and about 0.2 to about 1.5 equivalents of the hydroxy functional group contained in the hydroxy functional radiation-curable compound are used. It is desirable that the equivalent of the hydroxy functional groups in the polyol and the hydroxy functional radiation-curable compound be almost equal to the equivalent of the isocyanate group in the polyisocyanate.

In the reaction of these compounds, a catalyst for the urethane forming reaction can be utilized. Examples of suitable catalysts include:
copper naphthenate;
cobalt naphthenate;
zinc naphthenate;
n-butyl-tin-dilaurylate;
triethylamine;
1,4-diazabicyclo(2,2,2)octane; and
2,6,7-trimethyl-1,4-diazabicyclo(2,2,2)octane.

The catalyst is generally used in an amount of about 0.01 to about 1 part by weight for 100 parts by weight of the reaction raw materials. The reaction temperature is normally in the range of from 10° C. to about 90° C., preferably about 30° C. to about 80° C.

A preferred group of releasing oligomers are represented by the following oligomer (7):

$$R-I-((BHCA)_s-A-(BHCA)_v-I)_w-R \qquad (7)$$

The oligomer (7) was formed by reacting the following components:
R=a hydroxy functional, radiation-curable compound:
I=a polyisocyanate compound:
BHCA=a hydroxy carboxylic acid which is branched and/or which contains a non-terminal hydroxy functional group that provides a carbon-containing side chain bound to the polyester backbone upon reaction of the hydroxy functional group to form an ester group;
A=a polyol;
W=1 to about 20, preferably 1 to about 10, and most preferably 1 to about 5; and
S+V=4 to about 20, preferably about 5 to about 15, and most preferably about 12 on average. Alternatively, the radiation-curable functional groups "R" can be bound directly to the polyester backbone by reacting the hydroxy functional group of "R" with a carboxylic acid functional group on the polyester backbone to form an ester linkage. In this manner, the use of a polyisocyanate can be avoided.

A particularly preferred releasing oligomer is poly (hydroxystearic acid) urethane acrylate, which is represented by the following oligomer (8):

$$HA-I-Poly(HSA)-I-HA \qquad (8)$$

The oligomer (8) was formed from the following components:
HA=hydroxyethyl acrylate,
I=isophorone diisocyanate; and
Poly(HSA), which is represented by the following formula (9)

(9)

Where B+C=2 to about 20, preferably about 5 to about 15, and most preferably about 12 on average.

Another suitable way of formulating the releasing oligomer is to react polycarboxylic acids with polyols. The following formulae are representative examples of such reactions:

$$R-I-(A-(PAC-A)_t)-I-R \qquad (10)$$

$$R-(PAC-A)_t-I-R \qquad (11)$$

$$R-(PAC-(A-PAC)_t)-R \qquad (12)$$

Where PAC is a polycarboxylic compound;
I=a polyisocyanate compound;
R=a hydroxy functional radiation-curable compound;
A=a polyol; and
t=1 to about 20, preferably about 1 to about 15 on average. At least one of the polycarboxylic acid or the polyol is branched to provide a polyester backbone having carbon-containing side chains, or the polyol contains a non-terminal hydroxy functional group which provides a polyester backbone having carbon-containing side chains upon reaction of the hydroxy-functional group with a carboxylic acid to form an ester functional group. The structure of the releasing oligomer is not limited by the formulae 10 through 12.

I, R and A can be any of the compounds as described herein above.

PAC can be any polycarboxylic acid compound. Suitable polycarboxylic acids include:
oxalic acid;
malonic acid;
succinic acid;
glutaric acid;
adipic acid;
pimelic acid;
suberic acid;
azelaic acid;
sebacic acid;
maleic acid;
fumaric acid;
phthalic acid;
isophthalic acid;
terephthalic acid;
hemimellitic acid;
trimellitic acid;
pyromelitic acid; and
trimesic acid.

The releasing oligomer can be used as the main oligomer in the inner primary coating composition. However, usually other radiation-curable oligomers and monomers are combined with the releasing oligomer to tailor the properties of the inner primary coating as desired. Preferably, the radiation-curable monomers and oligomers present are selected to be compatible with the releasing oligomer such that the releasing oligomer remains dissolved or dispersed in the liquid radiation-curable composition. The compatibility of the monomers and oligomers with the releasing oligomer can be easily determined. In particular, the releasing oligomer can be separately combined with each of the desired monomers and oligomers. If a hazy mixture is observed, then the selected monomer or oligomer may be incompatible with the releasing oligomer. If a clear mixture is observed, the releasing oligomer may be compatible with the monomer or oligomer. By using monomers and oligomers which are compatible with the releasing oligomer, a compatible mixture can be formed. However, an incompatible mixture of monomers, oligomers and releasing oligomer can also be used if desired. In such a case, the inner primary composition may have to be agitated to disperse the releasing oligomer before application.

The inner primary coating compositions according to the present invention may also contain a reactive diluent which is used to adjust the viscosity. The reactive diluent can be a low viscosity monomer having at least one functional group capable of polymerization when exposed to actinic radiation. Usually, the viscosity of the low viscosity diluent monomer is from about 50 to about 500 centipoise at 25° C. Examples of suitable viscosities for optical glass fiber coating compositions range from about 500 to about 50,000 centipoise at 25° C. This functional group may be of the same nature as that used in the radiation-curable monomer or oligomer. Preferably, the functional group present in the reactive diluent is capable of copolymerizing with the radiation-curable functional group present on the releasing oligomer.

For example, the reactive diluent can be a monomer or mixture of monomers having an acrylate or vinyl ether functionality and an $C_4$–$C_{20}$ alkyl or polyether side chain. Particular examples of such reactive diluents include:
hexylacrylate,
2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone,
and the like.

Another type of reactive diluent that can be used is a compound having an aromatic group. Particular examples of reactive diluents having an aromatic group include:
ethyleneglycolphenylether-acrylate,
polyethyleneglycolphenyletheracrylate,
polypropyleneglycolphenylether-acrylate, and
alkyl-substituted phenyl derivatives of the above monomers, such as polyethyleneglycolnonylphenyl-etheracrylate.

The reactive diluent can also comprise a diluent having two or more functional groups capable of polymerization. Particular examples of such monomers include:
$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as
   1,6-hexanedioldiacrylate,
   trimethylolpropanetri-acrylate,
   hexanedioldivinylether,
   triethylene-glycoldiacrylate,
   pentaerythritol-triacrylate,
   ethoxylated bisphenol-A diacrylate, and
   tripropyleneglycol diacrylate.

If the radiation-curable functional group of the releasing oligomer is an epoxy group, for example, one or more of the following compounds can be used as the reactive diluent:
epoxy-cyclohexane,
phenylepoxyethane,
1,2-epoxy-4-vinylcyclohexane,
glycidylacrylate,
1,2-epoxy-4-epoxyethyl-cyclohexane,
diglycidylether of polyethylene-glycol,
diglycidylether of bisphenol-A,
and the like.

If the radiation-curable functional group of the releasing oligomer has an amine-ene or thiol-ene system, examples of reactive diluents having allylic unsaturation that can be used include:
diallylphthalate,
triallyltri-mellitate,
triallylcyanurate,
triallylisocyanurate, and
diallylisophthalate.

For amine-ene systems, amine functional diluents that can be used include, for example:
   the adduct of trimethylolpropane, isophorondiisocyanate and di(m)ethylethanolamine,
   the adduct of hexanediol, isophorone-diisocyanate and dipropylethanolamine, and
   the adduct of trimethylol propane, trimethylhexamethylenediisocyanate and di(m)ethylethanolamine.

The radiation-curable inner primary coating composition can contain free-radical generating photoinitiators. Examples of suitable free radical-type photoinitiators include, but are not limited to, the following:
isobutyl benzoin ether;
2,4,6 trimethylbenzoyl diphenylphosphine-oxide;
1-hydroxycyclohexylphenyl ketone;
2-benzyl-2-dimethylamino-1-(4-morpholinopheynyl)-butan-1-one;
2,2-dimethoxy-2-phenylacetophenone;
perfluorinated diphenyl titanocene;
2-methyl-1-[4-(methylthio)phenyl]-2-(4-morpholinyl)-1-propanone;
2-hydroxy-2-methyl-1-phenyl propan-1-one;
4-(2-hydroxyethyoxy)phenyl-2-hydroxy-2-propyl ketone
dimethoxyphenylacetophenone;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)-ketone;
diethoxyphenyl acetophenone;
a mixture of (2,6-dimethoxy benzoyl)-2,4,4 trimethylpentylphosphineoxide and 2-hydroxy-2-methyl-1-phenyl-propan-1-one;
benzophenone;
1-propanone, 2-methyl-1-1-(4-(methylthio)phenyl)2-(4-morpholyinyl); and
mixtures of these.

Other additives which can be used in the radiation-curable inner primary coating composition include, but are not limited to, catalysts, lubricants, wetting agents, antioxidants and stabilizers. The selection and use of such additives is within the skill of the art.

Coated optical fibers are often used in ribbon assemblies. Because of the versatility of the presently invented inner primary coating composition, this composition is very well suited for use on coated optical glass fibers in ribbon assemblies. The inner primary coatings made according to the present invention are surprisingly capable of providing a clean optical glass fiber subsequent to ribbon stripping, even without the use of conventional release agent additives. While not preferred, release agent additives may nevertheless be used if desired. Suitable release agent additives include silicones, silicone acrylates, fluorocarbon oils or resins and the like. Because the inner primary coatings according to the present invention inherently provide clean ribbon stripping, release agent additives can be added in significantly reduced amounts compared to conventional inner primary coatings. For example, the release agent additive(s) can be present in an amount of about 0.1 to about 5 wt. % based on the total weight of the inner primary composition.

Based on the above, a suitable radiation-curable inner primary composition can be formulated from a composition containing:

from about 1 to about 99 weight % of at least one releasing oligomer;

from about 1 to about 90 weight % of other radiation-curable oligomer(s) or diluent monomer(s).

Preferred amounts of other radiation-curable oligomer(s) include from about 10 to about 70% by weight, more preferably, about 20 to about 60% by weight, based on the total weight of the inner primary composition.

Preferred amounts of the radiation-curable diluent monomer(s) include from about 5 to about 70% by weight, more preferably, about 10 to about 60% by weight, based on the total weight of the inner primary composition.

Preferably, the inner primary composition contains a photoinitiator(s) in an amount of about 1 to about 20% by weight, more preferably about 1 to about 10% by weight, based on the total weight of the inner primary composition.

Inner primary coatings are usually about 90 to about 120 microns thick, and should be concentric to prevent attenuation of the signal transmission. The inner primary coating also generally has a Tg of less than about 20° C., more preferably less than about 0° C.

The inner primary coating composition can be applied to the coated optical glass and cured using any suitable method.

Ribbon assemblies are now well known in the art and one skilled in the art will easily be able to use the disclosure provided herein to prepare a novel ribbon assembly containing at least one of the improved coated optical glass fibers for the desired applications. The novel ribbon assembly made according to this invention can be used in telecommunication systems. Such telecommunication systems typically include ribbon assemblies containing optical glass fibers, transmitters, receivers, and switches. The ribbon assembly containing the coated optical glass fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention can also be used in cable television systems. Such cable television systems typically include ribbon assemblies containing optical glass fibers, transmitters, receivers, and switches. The ribbon assembly containing the coated optical glass fibers are the fundamental connecting units of such cable television systems. The ribbon assembly can be buried under ground or water for long distance connections, such as between cities. The ribbon assembly can also be used to connect directly to residential homes.

The invention will be further explained by way of the following examples, without being limited thereto.

EXAMPLES 1–10 AND COMPARATIVE EXAMPLES A AND B

A releasing oligomer according to the present invention was first formed. A poly(12-hydroxystearic acid/2-butyl,2-ethylpropanediol)ester (hereinafter referred to as "poly HSA") was formed as follows. 189.9 grams of hydroxystearic acid, 10.1 grams of butyl ethylpropanediol and 0.15 grams of butylstannoic acid were combined in a reaction vessel. 40 ml of xylene was added to the reaction vessel as a refluxing agent. The mixture was heated until it melted and then further heated to about 180–220° C. for about 23 hours. The reaction vessel was then cooled and the xylene was separated from the formed releasing oligomer using a RotoVap at 50° C.

The poly HSA was then reacted to form a urethane acrylate of the poly HSA (referred to as "poly(12HSA)UA") as follows. 421.8 grams of isophorone diisocyanate, 1.82 grams of dibutyltin dilaurate and 1.82 grams of 2,6-di-tert-butyl-4-methylphenol were added to a four-neck 5 L flask equipped with an overhead stirrer, thermocouple, gas inlet, and a 2-neck adapter which held a pressure equalized addition funnel, and a condensor. The mixture was purged with dry air and stirred to dissolve the solids. 219.7 grams of 2-hydroxyethyl acrylate was added dropwise to the reaction flask while maintaining a temperature below 35° C. using an ice bath. After the addition was complete, the temperature of the reaction mixture was increased to 40° C. and held there for about one hour. An aliquot was then pulled from the reaction flask. The reaction between the hydroxy functional group on the hydroxyethyl acrylate and the diisocyanate compound was complete as determined by the isocyanate content of the aliquot. Then 2943.6 grams of poly HSA was added to the reaction flask all at once and the temperature was increased to 80° C. The reaction was completed after 16 hours as confirmed by isocyanate content.

The structure of the formed releasing oligomer is represented by the following formula:

where HA=hydroxyethyl acrylate,

I=isophorone diisocyanate; and

Poly(HSA) is represented by the following formula (9)

where x+y=about 12 on average.

The effects of using the releasing oligomer to form cured inner primary coatings was tested as follows. Inner primary coating compositions were first formulated by combining successively increased amounts of the releasing oligomer with the commercially radiation-curable, inner primary coating composition, as shown in Table 1. The compositions were suitably cured by exposure to UV light and the fiber friction and crack propagation properties of the cured coatings were measured. The test results are shown in Table 1.

For comparison, two examples of a commercially available radiation-curable, inner primary coating composition were tested. Comparative Example A was a sample taken from a commercially available lot. Comparative Example B was formulated on a small scale in the lab, in a manner similar to Example 1. Films were formed as in Example 1 and the properties of the films were tested. The test results are shown in Table 1.

Examples 1 through 7 replaced the main radiation-curable oligomer and other radiation-curable components, in the commercially available composition (Comparative Examples A and B) with successively increased amounts of a radiation-curable releasing oligomer according to the present invention. These test results clearly demonstrate that as the amount of releasing oligomer is increased, surprisingly, the fiber pull-out friction is reduced and the crack propagation is increased. A crack propagation of "no break" is the maximum obtainable value. These results further demonstrate that the releasing oligomer can be utilized to adjust the fiber friction to provide fiber friction and crack propagation values suitable for ribbon assembly application, even without the use of conventional release agent additives.

TABLE 1

| | A | B | 1 | 2 | 3 | 4 | 5 | 6 | 7 | 8 | 9 | 10 |
|---|---|---|---|---|---|---|---|---|---|---|---|---|
| Component (parts by weight) | | | | | | | | | | | | |
| Conventional Urethane Acrylate Oligomer Number Average MW 3000 | 56 | 56 | 55.86 | 55.72 | 55.16 | 54.6 | 53.2 | 50.4 | 47.6 | 0 | 0 | 0 |
| Poly(12HSA)UA Releasing Oligomer (Batch 1) | 0 | 0 | 0.25 | 0.5 | 1.5 | 2.5 | 5 | 10 | 15 | 56 | 56 | 97 |
| Isodecyl Acrylate | 14 | 14 | 13.97 | 13.93 | 13.79 | 13.65 | 13.3 | 12.6 | 11.9 | 14 | 14 | 0 |
| Ethoxylated Nonylphenol Acrylate | 25.5 | 25.5 | 25.44 | 25.37 | 25.12 | 24.86 | 24.23 | 22.95 | 21.68 | 25.5 | 25.5 | 0 |
| 75% 2-Hydroxy-2-Methyl-1-Phenylpropan-1-one, and 25% Bis(2,6-Dimethoxybenzoyl)-2,4,4-Trimethylpentyl Phosphine Oxide | 3 | 3 | 2.99 | 2.99 | 2.96 | 2.93 | 2.85 | 2.7 | 2.55 | 3 | 3 | 3 |
| Thiodiethylene bis(3,5-di-tert-butyl-4-hydroxy hydrocinnamate) | 0.5 | 0.5 | 0.5 | 0.5 | 0.49 | 0.49 | 0.48 | 0.45 | 0.43 | 0.5 | 0.5 | 0 |
| Gamma Mercaptopropyl Trimethoxysilane | 1 | 1 | 1 | 1 | 0.99 | 0.98 | 0.95 | 0.9 | 0.85 | 1 | 1 | 0 |
| Test Results | | | | | | | | | | | | |
| Compatibility | Clear | Clear | Hazy | Hazy | Hazy | Hazy | Hazy | Hazy | Hazy | Clear | Clear | Hazy |
| Crack Propagation (mm) | 0.99 | 1.12 | 1.1 | 1.05 | 1.13 | 1.34 | 1.32 | 1.48 | No Break | ND | 0.6 | ND |
| Fiber Pull-Out Friction (g/mm) | 25.73 | 50.1 | 30.36 | 24.28 | 21.91 | 19.95 | 11.5 | 9.6 | 7.7/5.1 | 2.65 | — | 1.6 |
| Tensile Strength (MPa) | — | — | — | — | — | — | — | — | — | <0.1 | — | — |
| Elongation (%) | — | — | — | — | — | — | — | — | — | 32 | — | — |
| Modulus (MPA) | — | — | — | — | — | — | — | — | — | 0.2 | — | — |

Comparative Example A was taken from a commercial lot. Comparative Example B was formulated in the laboratory.
"ND" means that the film could not be removed from the glass plate.
"—" means not tested.
The properties of Example 7 were measured twice.

The crack propagation is a measure of the cohesive strength of the inner primary coating. The greater the cohesive strength of the inner primary coating the greater the amount of energy required to break apart the inner primary coating. Thus, an inner primary coating having a higher cohesive strength can withstand greater stripping forces during ribbon stripping without breaking apart and leaving residue on the surface of the optical glass fiber, than an inner primary coating having a lower cohesive strength.

The fiber pull-out friction of the inner primary coating is an estimate of the fiber friction between the inner primary coating and the bare optical glass fiber. In general, the lower the fiber pull-out friction of the inner primary coating the lower the fiber friction between the optical glass fiber and the inner primary coating, the lower the resistive force, and the easier the inner primary coating will slide off of the optical glass fiber. Also, the lower the fiber friction, the less force that will be applied to the inner primary coating to conduct ribbon stripping. The less the force being applied to the inner primary coating, the lower the chance that the cohesiveness of the inner primary coating will fail, thus leaving inner primary coating residue on the surface of the optical glass fiber.

EXAMPLES 11–15 AND COMPARATIVE EXAMPLES B–G

Examples 11–15 and Comparative Examples B–G were formulated by combining the components shown in Table 2.

Examples 11–15 contained a releasing oligomer ("Poly(1 2HSA)UA Pilot") which was formulated in a manner similar to the releasing oligomer of Example 1, except that the releasing oligomer was prepared in a scaled-up pilot plant in an amount of about 10 Kg.

Comparative Examples C–G used a comparative polyester oligomer ("Poly(HDA)UA") which was formulated in a manner similar to releasing polyester oligomer of Example 1 except that the comparative polyester oligomer was formulated from hydroxy dodecanoic acid and 2-butyl-2-ethylpropanediol. The comparative polyester oligomer contained very few side chains, which were provided by 2-butyl-2-ethylpropanediol.

The compositions were suitably cured by exposure to UV radiation and the properties of the cured coating were measured. The test results are shown in Table 2.

TABLE 2

|  | B | 11 | 12 | 13 | 14 | 15 | C | D | E | F | G |
|---|---|---|---|---|---|---|---|---|---|---|---|
| Component (parts by weight) | | | | | | | | | | | |
| Conventional Urethane Acrylate Oligomer (Number Average MW 3000) | 56 | 55.2 | 53.6 | 52.00 | 48.00 | 44.00 | 55.20 | 53.60 | 52.00 | 48.00 | 44.00 |
| Poly(12HSA)UA Releasing Oligomer (Pilot) | 0 | 1.00 | 3.00 | 5.00 | 10.00 | 15.00 | 0 | 0 | 0 | 0 | 0 |
| Poly(12HDA)UA (no side chain) | 0 | 0 | 0 | 0 | 0 | 0 | 1.43 | 4.29 | 7.14 | 18.29 | 21.43 |
| Isodecyl Acrylate | 14.00 | 13.80 | 13.40 | 13.00 | 12.00 | 11.00 | 13.80 | 13.40 | 13.00 | 12.00 | 11.00 |
| Ethoxylated Nonylphenol Acrylate | 25.50 | 25.50 | 25.50 | 25.50 | 25.50 | 25.50 | 25.07 | 24.21 | 23.36 | 21.21 | 19.07 |
| 2-Hydroxy-2-methyl-1-phenylpropan-1-one (75%); Bis(2,6-dimethoxybenzoyl)-2,4,4-trimethylpentyl phosphine oxide (25%) | 3.00 | 3.00 | 3.00 | 3.00 | 3.00 | 3.00 | 3.00 | 3.00 | 3.00 | 3.00 | 3.00 |
| Thiodiethylene bis(3,5-di-tert-butyl-4-hydroxy hydrocinnamate) | 0.50 | 0.50 | 0.50 | 0.50 | 0.50 | 0.50 | 0.50 | 0.50 | 0.50 | 0.50 | 0.50 |
| Gamma mercaptopropyl trimethoxysilane | 1.00 | 1.00 | 1.00 | 1.00 | 1.00 | 1.00 | 1.00 | 1.00 | 1.00 | 1.00 | 1.00 |
| Test Results | | | | | | | | | | | |
| Compatibility | Clear | Clear | Clear | Clear | Clear | Clear | Hazy | Hazy | Paste | Paste | Paste |
| Crack Propagation (mm) | 1.12 | 0.96 | 1.03 | 1.01 | 1.10 | 1.05 | 1.46 | 1.17 | 1.21 | 1.37 | 0.99 |
| Fiber Pull-Out Friction (g/mm) | 50.10 | 45.54 | 38.15 | 46.34 | 36.08 | 27.85 | 44.64 | 45.28 | 44.60 | 50.45 | 48.57 |

The crack propagation and fiber pull-out friction results shown in Table 2 demonstrate that the releasing oligomer according to the present invention can be utilized in radiation-curable inner primary coating compositions to provide inner primary coatings which are suitable for use in ribbon assemblies when ribbon stripping properties are desired. The results further demonstrate that the releasing oligomer can be utilized to adjust the fiber friction to provide suitable fiber frictions, even without the use of conventional release agent additives.

By comparing the Examples with the Comparative examples, it is evident that the presence of the side chains on the polyester backbone significantly reduced the fiber pull-out friction. Comparative Examples C–G contained very few side chains on the polyester backbone. In contrast, Examples 11–15 contained a significantly greater amount of side chains on the polyester backbone. These test results also demonstrate that the releasing oligomer is capable of increasing the crack propagation in combination with reducing the fiber pull-out friction of the cured coating.

EXAMPLES 16–22

Examples 16–22 were formulated by combining the components shown in Table 3.

Example 16 utilized a releasing oligomer ("Poly(12HSA) UA") which was formulated in a manner similar to the releasing oligomer of Example 1. Two batches of the releasing oligomer were formed under the same reaction conditions, namely batch 1 and batch 2.

Examples 17 and 18 contained a low molecular weight releasing oligomer. The low molecular weight releasing oligomer was formulated using a ratio of polyHSA:2-Butyl-2-ethylpropanediol of 4:1.

Examples 19 and 20 used a releasing polyester oligomer which was formulated in a manner similar to the releasing polyester oligomer of Example 1 except that ricinoleic acid was used in place of hydroxystearic acid.

Examples 21 and 22 contained a releasing polyester oligomer which was formulated in a manner similar to the releasing polyester oligomer of Example 1 except that diethylene glycol ("DEG") was used in place of 2-butyl-2-ethylpropanediol ("BEPD").

The compositions were suitably cured by exposure to UV radiation and the properties of the cured coating were measured. The test results are shown in Table 3.

TABLE 3

|  | 16 | 17 | 18 | 19 | 20 | 21 | 22 |
|---|---|---|---|---|---|---|---|
| Component (parts by weight) | | | | | | | |
| Conventional Urethane Acrylate Oligomer (Number Average MW 4800) | 14.00 | 14.00 | 14.00 | 14.00 | 14.00 | 14.00 | 14.00 |
| Poly(12HSA)UA Releasing Oligomer (Batch 1) | 56.00 | 0 | 0 | 0 | 0 | 0 | 0 |
| Poly(12HSA)UA Releasing Oligomer (Lower MW) | 0 | 56.00 | 56.00 | 0 | 0 | 0 | 0 |
| Releasing Oligomer Replacing 12HSA with Ricinoleic Acid | 0 | 0 | 0 | 56.00 | 56.00 | 0 | 0 |
| Releasing Oligomer Replacing BEPD with DEG | 0 | 0 | 0 | 0 | 0 | 56.00 | 56.00 |
| Ethoxylated Nonylphenol Acrylate | 25.50 | 25.50 | 0 | 25.50 | 0 | 25.50 | 0 |

TABLE 3-continued

|  | 16 | 17 | 18 | 19 | 20 | 21 | 22 |
|---|---|---|---|---|---|---|---|
| Acrylate of Polyoxyethylated Monononyl Phenyl Ether | 0 | 0 | 12.25 | 0 | 12.25 | 0 | 12.25 |
| Isobornyl Acrylate | 0 | 0 | 12.25 | 0 | 12.25 | 0 | 12.25 |
| 75% 2-Hydroxy-2-Methyl-1-Phenyl-Propan-1-one, and 25% Bis(2,6-Dimethoxybenzoyl)-2,4,4-Trimethylpentyl Phosphine Oxide | 3.00 | 3.00 | 3.00 | 3.00 | 3.00 | 3.00 | 3.00 |
| Thiodiethylene Bis(3,5-di-tert-butyl-4-hydroxy hydrocinnamate) | 0.50 | 0.50 | 0.50 | 0.50 | 0.50 | 0.50 | 0.50 |
| Gamma Mercaptopropyl Trimethoxy Silane | 1.00 | 1.00 | 1.00 | 1.00 | 1.00 | 1.00 | 1.00 |
| Test Results |  |  |  |  |  |  |  |
| Compatibility | Hazy | Clear | Clear | Clear | Clear | Clear | Clear |
| Crack Propagation (mm) | 3.30 | 0.63 | 0.71 | 1.37 | 1.48 | 1.26 | 1.16 |
| Fiber Pull-Out Friction (g/mm) | — | 30.34 | 47.64 | 16.45 | 15.72 | 16.16 | 13.71 |
| Tensile (MPa) | — | 0.62 | 1.36 | 0.30 | 0.30 | — | — |
| Elongation (%) | — | 48.00 | 112.00 | 94.00 | 120.00 | — | — |
| Modulus (MPa) | — | 1.93 | 1.93 | 0.60 | 0.60 | — | — |
| Tan delta max (° C.) | — | 11.50 | 7.80 | −35.80 | −24.60 | — | — |
| E' = 1000 MPa (° C.) | — | −47.50 | −35.90 | −65.40 | −59.10 | — | — |
| E' = 100 MPa (° C.) | — | −24.40 | −6.50 | −48.20 | −39.30 | — | — |
| E$^0$ (MPa) | — | 2.30 | 2.58 | 0.59 | 0.59 | — | — |

"—" means not tested.

Examples 17–22 demonstrate the effectiveness of different embodiments of present invention. Various polyester backbones having the required amount of carbon-containing side chains were utilized to form the releasing oligomers. These test results show that the different releasing oligomers can be utilized in radiation-curable coating compositions to increase the crack propagation in combination with reducing the fiber pull-out friction. Thus, the different releasing oligomers can be utilized to provide inner primary coatings which are suitable for use in ribbon assemblies where ribbon stripping properties are desired.

EXAMPLES 23–30

Examples 23–30 were formulated by combining the components shown in Table 4.

Examples 23–25 utilized a releasing oligomer ("Poly(12HSA)UA") which was formulated in a manner similar to the releasing oligomer of Example 1. Two batches of the releasing oligomer were formed under the same reaction conditions, namely batch 1 and batch 2.

Examples 26–30 contained a releasing oligomer ("Poly(12HSA) Pilot") which was formulated in a manner similar to the releasing oligomer Example 1, except that the releasing oligomer was formulated in a scaled-up pilot plant in an amount of about 10Kg.

The compositions were suitably cured by exposure to UV radiation and the properties of the cured coating were measured. The test results are shown in Table 4.

TABLE 4

|  | 16 | 23 | 24 | 25 | 26 | 27 | 28 | 29 | 30 |
|---|---|---|---|---|---|---|---|---|---|
| Component (parts by weight) |  |  |  |  |  |  |  |  |  |
| Conventional Urethane Acrylate Oligomer (Number Average MW 4800) | 14.00 | 14.00 | 7.00 | 14.00 | 14.00 | 14.00 | 14.00 | 14.00 | 14.00 |
| Poly(12HSA)UA Releasing Oligomer (Batch 1) | 56.00 | 56.00 | 0 | 0 | 0 | 0 | 0 | 0 | 0 |
| Poly(12HSA)UA Releasing Oligomer (Batch 2) | 0 | 0 | 56.00 | 49.00 | 0 | 0 | 0 | 0 | 0 |
| Poly(12HSA)UA Releasing Oligomer (Pilot) | 0 | 0 | 0 | 0 | 49.00 | 49.00 | 51.30 | 52.50 | 52.50 |
| Ethoxylated Nonylphenol Acrylate | 25.50 | 0 | 0 | 0 | 0 | 0 | 0 | 0 | 0 |
| Acrylate of Polyoxyethylated Monononyl Phenyl Ether | 0 | 12.75 | 15.75 | 15.75 | 19.25 | 12.25 | 14.60 | 12.25 | 15.75 |
| Isobornyl Acrylate | 0 | 12.75 | 15.75 | 15.75 | 12.25 | 19.25 | 14.60 | 15.75 | 12.25 |
| 75% 2-Hydroxy-2-Methyl-1-Phenyl-Propan-1-one, and 25% Bis(2,6-Dimethoxybenzoyl)-2,4,4-Trimethylpentyl Phosphine Oxide | 3.00 | 3.00 | 3.00 | 3.00 | 3.00 | 3.00 | 3.00 | 3.00 | 3.00 |
| Thiodiethylene Bis(3,5-di-tert-butyl-4-hydroxy hydrocinnamate) | 0.50 | 0.50 | 0.50 | 0.50 | 0.50 | 0.50 | 0.50 | 0.50 | 0.50 |
| Gamma Mercaptopropyl Trimethoxy Silane | 1.00 | 1.00 | 1.00 | 1.00 | 1.00 | 1.00 | 1.00 | 1.00 | 1.00 |
| Test Results |  |  |  |  |  |  |  |  |  |
| Compatibility | Hazy | Hazy | Clear | Clear | Clear | Clear | Clear | Clear | Clear |
| Crack Propagation (mm) | 3.30 | 3.40 | 0.80 | 0.92 | 1.21 | 1.33 | 1.02 | 1.21 | 1.11 |
| Fiber Pull-Out Friction (g/mm) | — | — | 16.90 | 11.30 | 23.00 | 20.90 | 21.60 | 21.20 | 18.80 |
| Tensile (MPa) | — | — | 0.30 | 0.50 | 0.40 | 0.40 | 0.50 | 0.50 | 0.40 |
| Elongation (%) | — | — | 77.00 | 107.00 | 138.00 | 123.00 | 148.00 | 150.00 | 137.00 |
| Modulus (MPa) | — | — | 0.70 | 0.90 | 0.60 | 0.60 | 0.60 | 0.60 | 0.60 |

TABLE 4-continued

|  | 16 | 23 | 24 | 25 | 26 | 27 | 28 | 29 | 30 |
|---|---|---|---|---|---|---|---|---|---|
| Tan delta max (° C.) | — | — | — | — | −9.00 | −5.00 | −1.00 | −10.00 | −12.00 |
| E' = 1000 MPa (° C.) | — | — | — | — | −48.00 | −45.00 | −47.00 | −49.00 | −49.00 |
| E' = 100 MPa (° C.) | — | — | — | — | −13.00 | −24.00 | −25.00 | −26.00 | −28.00 |
| E° (MPa) | — | — | — | — | 0.80 | 0.80 | 0.70 | 0.80 | 0.90 |

"—" means not tested.

The crack propagation and fiber pull-out friction results shown in Table 4 demonstrate that the releasing oligomer according to the present invention can be utilized in radiation-curable inner primary coating compositions to provide inner primary coatings which are suitable for use in ribbon assemblies where ribbon stripping properties are desired. The results further demonstrate that the releasing oligomer can be utilized to adjust the fiber friction to provide suitable fiber frictions, even without the use of conventional release agent additives.

EXAMPLES 31–32 AND COMPARATIVE EXAMPLE H

Drawdowns of the radiation-curable compositions of Examples 23 and 25 and a commercially available inner primary coating composition were formed and suitably cured by exposure to UV light to provide coatings. Example 31 was a coating formed from the composition of Example 23, and Example 32 was a coating formed from the composition of Example 25. Comparative Example H was a coating formed from the commercially available inner primary coating composition.

Figure 1:
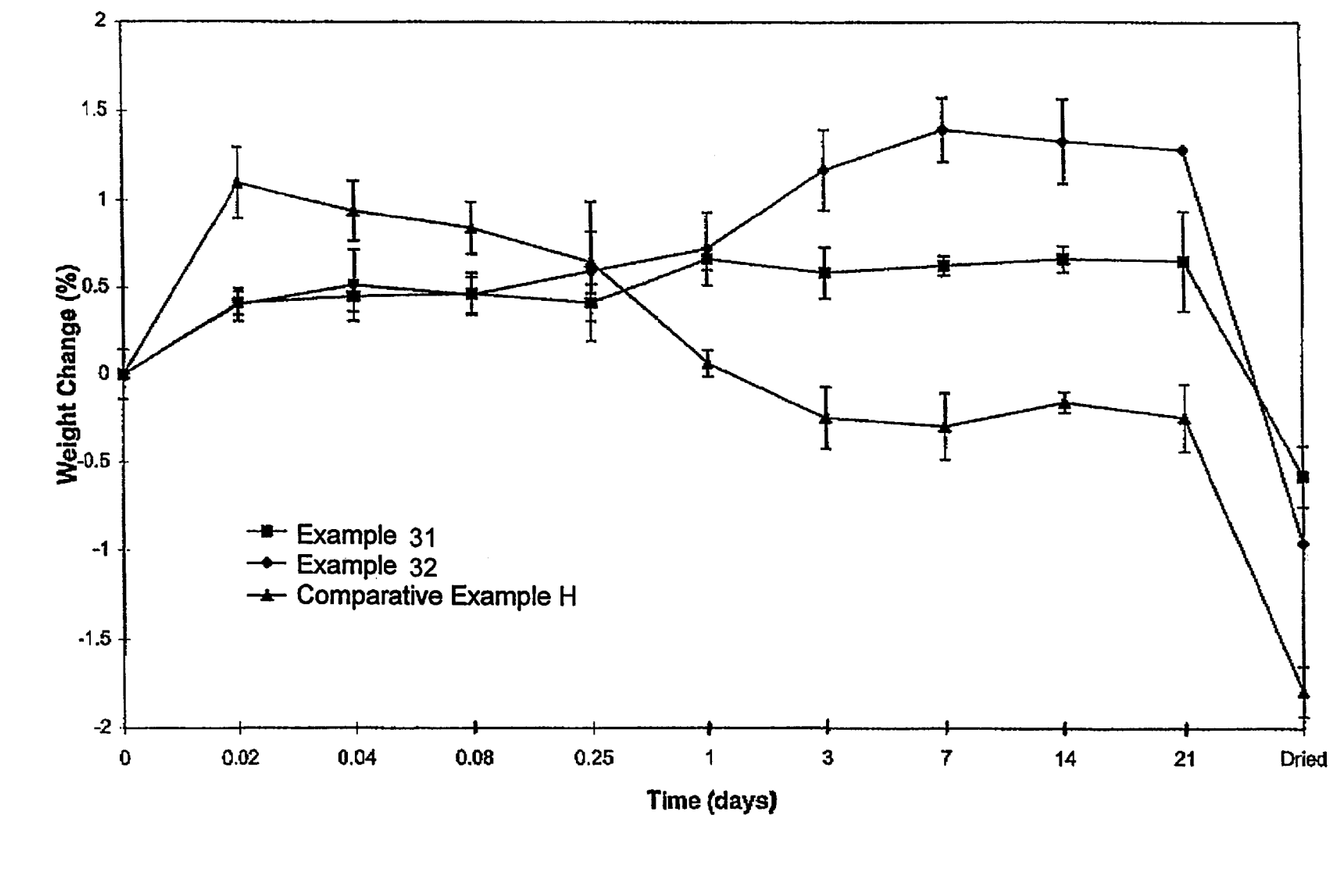
The drawing illustrates a graph of the weight change versus time for examples according to the present invention and a conventional inner primary coating.

The water soak extraction and adsorption was measured for each of the coatings. The drawing illustrates the weight of the coating versus time. As can be seen from the drawing, the commercially available coating, Comparative Example H, gained more weight during the first day, then Examples 31 and 32 according to the present invention. Therefore, Comparative Example H was more hydrophilic than Examples 31 and 32.

Comparative Example H lost more weight from day 1 to the 21$^{st}$ day. Therefore, Comparative Example H contains a greater quantity of extractable material than Examples 31 and 32. The greater the quantity of extractables the less desirable the coating.

Test Procedures

Crack Propagation

The crack propagation can be measured as follows. First make a 75 micron thick drawdown of the inner primary composition and then cure the film by exposing it to 1.0 J/cm$^2$ of UV from a Fusion D lamp under a nitrogen atmosphere. Cut three test strips of dimensions 35 mm long, 12 mm wide, and 75 micron thick. A cut 2.5 mm long is made in the side of each strip. A strip is mounted in a RSA-II rheometer, the temperature brought to 90° C. (representative ribbon stripping temperature), and a constant extension rate of 0.1 mm/second is applied to the test strip. The measure of cohesive strength is the increase in length ΔL before the crack propagates across the width of the test strip. The gauge length is constant at 23.2 mm. The value reported is currently the average of three measurements.

Fibber Pull-Out Friction

The fiber pull-out friction can be measured as follows. The sample consists of a bare, clean optical fiber, one end of which has been embedded in a 250 micron thick sheet of cured inner primary coating to be tested. This assembly is mounted in a suitable instrument such as a Rheometrics RSA-II rheometer, and the temperature raised to a representative ribbon stripping temperature (such as 90° C.), and the fiber pulled slowly out of the sheet at a rate of 0.1 mm/sec. The instrument records and plots force vs distance. The plots typically show a linear region of negative slope, which is the result of a decreasing area of contact between fiber and coating, as the fiber is being withdrawn. The slope is measured, and is the output of the test. Low slope values correspond to a low fiber pull-out friction, and vice versa. Three test samples should be performed and their average used as the final output of the test.

Water Soak Extraction and Adsorption

The water soak extraction and absorption were measured using the following procedure. A drawdown of each material to be tested was made at a film thickness of about 150 microns (8 mils) on a glass plate and cured. The cured film was cut to form three sample specimens, approximately 3 cm×3 cm (1½×1½), on the glass plate. The glass plate containing the three sample specimens was heated at 60° C. for one hour and then placed in a desiccator for 15 minutes.

125 ml (4 oz.) of deionized or distilled waterwas poured into three 125 ml (4 oz.) glass jars, maintained at a temperature of 23±2° C. Each of the sample specimens were removed from the glass plate and weighed on an analytical balance using corrugated Teflon paper to prevent sticking. Each sample specimen was then placed into one of the jars of water.

The sample specimens were soaked in the water for 30 minutes and then removed from the glass jars. The water remaining on the surface of the sample specimens was removed by blotting them with lint free wiping tissue.

The samples were reweighed as above and placed back into their respective jars.

The above procedure was repeated at 0.02, 0.04, 0.08, 0.25, 1, 3, 7, 14, and 21 days.

At 21 days, the sample specimens were removed from the glass jars and reweighed as above. The sample specimens were placed onto a glass plate and heated at 60° C. for one hour, and then placed in a desiccator for 15 minutes. The sample specimens were reweighed as before.

The percent weight change at each time interval for each sample specimen was determined. The values for the three sample specimens at each time interval were averaged. The water absorption reported is the largest, positive average percent weight change.

The water extraction for each sample specimen was determined by dividing the difference of the initial and 21-day dried weights by the initial dried weight and multiplying by 100. The reported value is the average of the three sample specimen values.

The total water sensitivity is the sum of the absolute values of the water absorption and the water extraction.

While the invention has been described in detail and with reference to specific embodiments thereof, it will be apparent to those of ordinary skill in the art that various changes and modifications can be made to the claimed invention without departing from the spirit and scope thereof.

What is claimed is:

1. A radiation-curable, inner primary coating composition adapted for forming inner primary coatings on optical glass fibers, said coating composition being formulated from a composition comprising:

about 1 to about 99% by weight of at least one radiation-curable acrylate functional releasing oligomer having a number average molecular weight of about 2,000 to about 8,500 having a general structure:

wherein R=a hydroxy functional, radiation-curable compound;
I=a polyisocyanate compound:
A=a polyol;
W=1 to about 20 on average;
S+V=4 to about 20 on average; and
BHCA= wherein: H=a hydrogen atom;
O=an oxygen atom;
$R_1$, $R_2$, $R_3$, $R_4$, $R_5$, and $R_6$=H or a carbon-containing side-chain having from 1 to about 30 carbon atoms connected by a carbon—carbon single bond to the polyester backbone in said polyester, with the proviso that at least one of $R_1$ through $R_6$ is a carbon-containing side-chain having at least about 3 carbon atoms and X+Y+Z≧3, wherein said carbon-containing side-chains comprise at least about 5% of the number average molecular weight of said releasing oligomer;
at least one photoinitiator; and
about 1 to about 90% of at least one other radiation-curable acrylate oligomer or diluent acrylate monomer in an amount to provide said coating composition with a viscosity suitable for application to optical glass fibers, wherein the composition is formulated such that when radiation-cured at a dose of 1.0 J/cm² or less the cured coating provides the combination of properties;
(1) a Tg of less than 20° C.;
(2) a crack propagation of at least about 1 mm at a rate of 0.1 mm/second; and
(3) a fiber pull-out friction of about 30 g/mm at a rate of 0.1 mm/second or less, wherein all % by weight are based on the total weight of the composition.

2. A radiation-curable composition according to claim 1, wherein said oligomer is present in an amount sufficient to provide said inner primary coating with a fiber pull-out friction of about 30 g/mm or less in combination with a crack propagation of about 1 mm or more.

3. A radiation-curable composition according to claim 1, wherein said releasing oligomer is present in an amount sufficient to provide said inner primary coating with a fiber pull-out friction of about 20 g/mm or less in combination with a crack propagation of about 1 mm or more.

4. A radiation-curable composition according to claim 1, wherein said carbon-containing side-chains comprise from about 10 to about 30% of the number average molecular weight of said oligomer.

5. A radiation-curable composition according to claim 1, wherein said carbon-containing side-chains comprise from about 15 to about 20% of the number average molecular weight of said oligomer.

6. A radiation-curable, inner primary coating composition according to claim 1, wherein said carbon-containing side-chains each comprising lower alkyls or alkyl substituted aryls having from about 3 to about 30 carbon atoms.

7. A radiation-curable composition according to claim 1, wherein said carbon-containing side-chains comprise lower alkyls or alkyl substituted aryls having from about 5 to about 20 carbon atoms.

8. A radiation-curable composition according to claim 1, wherein said releasing oligomer has a number average molecular weight of from about 2,500 to about 8,000.

9. A radiation-curable composition according to claim 1, wherein said hydroxycarboxylic acid contains from about 8 to about 30 carbon atoms.

10. A radiation-curable composition according to claim 1, wherein said hydroxycarboxylic acid is selected from the group consisting of hydroxy caprylic acid, hydroxy capric acid, hydroxy lauric acid, hydroxy myristic acid, hydroxy palmitic acid, hydroxy stearic acid, hydroxy oleic acid, hydroxy linoleic acid, and hydroxy linolenic acid.

11. A radiation-curable composition according to claim 1, wherein said hydroxycarboxylic acid comprises hydroxy stearic acid.

12. A radiation-curable inner-primary coating composition adapted for forming inner primary coatings on optical glass fibers, said coating composition being formulated from a composition comprising:

about 1 to about 99% by weight of at least one radiation-curable acrylate functional releasing oligomer having a number average molecular weight of about 2,000 to about 8,500 , wherein said releasing oligomer is formulated from at least one combination of reactants according to the following formulae:

wherein
I is a polyisocyanate compound;
A is a polyol;
P is a hydroxy functional compound;
R is a hydroxy functional, radiation-curable compound;
n is from 1 to about 20 on average;
m is from 1 to about 50 on average; and
BHCA= wherein: H=a hydrogen atom;
O=an oxygen atom;
$R_1$, $R_2$, $R_3$, $R_4$, $R_5$, and $R_6$=H or a carbon-containing side-chain having from 1 to about 30 carbon atoms connected by a carbon—carbon single bond to the polyester backbone in said polyester, with the proviso that at least one of $R_1$ through $R_6$ is a carbon-containing side-chain having at least about 3 carbon atoms and $X+Y+Z \geq 3$, wherein said carbon-containing side-chains comprise at least about 5% of the number average molecular weight of said releasing oligomer;

at least one photoinitiator; and about 1 to about 90% of at least one other radiation-curable acrylate oligomer or diluent acrylate monomer in an amount to provide said coating composition with a viscosity suitable for application to optical glass fibers, wherein the composition is formulated such that when radiation-cured at a dose of 1.0 J/cm² or less the cured coating provides the combination of properties;

(1) a Tg of less than 20° C;

(2) a crack propagation of at least about 1 mm at a rate of 0.1 mm/second; and (3) a fiber pull-out friction of about 30 g/mm at a rate of 0.1 mm/second or less, wherein all % by weight are based on the total weight of the composition.

13. A radiation-curable composition according to claim 12, wherein $X+Y+Z \geq 5$.

14. A radiation-curable composition according to claim 12, wherein said oligomer is present in an amount sufficient to provide said inner primary coating with a fiber pull-out friction of about 20 g/mm or less in combination with a crack propagation of about 1 mm or more.

15. A radiation-curable composition according to claim 12, wherein said carbon-containing side-chains comprise from about 10 to about 30% of the number average molecular weight of said oligomer.

16. A radiation-curable composition according to claim 12, wherein said carbon-containing side-chains comprise from about 15 to about 20% of the number average molecular weight of said oligomer.

17. A radiation-curable composition according to claim 12, wherein said carbon-containing side-chains comprise lower alkyls or alkyl substituted aryls having from about 3 to about 30 carbon atoms.

18. A radiation-curable composition according to claim 12, wherein said carbon-containing side-chains comprise lower alkyls or alkyl substituted aryls having from about 5 to about 20 carbon atoms.

19. A radiation-curable composition according to claim 12, wherein said oligomer contains from about 2 to about 40 equivalents of ester functional groups.

20. A radiation-curable composition according to claim 12, wherein said oligomer contains from about 3 to about 20 equivalents of ester functional groups.

21. A radiation-curable composition according to claim 12, wherein said oligomer has a number average molecular weight of from about 2,500 to about 8,000.

22. A radiation-curable composition according to claim 1, wherein $X+Y+Z \geq 5$.

23. A radiation-curable composition according to claim 1, further comprising about 1 to about 90% of at least one other radiation-curable oligomer.

24. A radiation-curable composition according to claim 1, further comprising about 10 to about 70% of at least one other radiation-curable oligomer.

25. A radiation-curable composition according to claim 1, further comprising about 20 to about 60% of at least one other radiation-curable oligomer.

26. A radiation-curable composition according to claim 12, further comprising about 1 to about 90% of at least one other radiation-curable oligomer.

27. A radiation-curable composition according to claim 12, further comprising about 10 to about 70% of at least one other radiation-curable oligomer.

28. A radiation-curable composition according to claim 12, further comprising about 20 to about 60% of at least one other radiation-curable oligomer.

29. A radiation-curable composition according to claim 1, wherein W=1 to about 10 on average and S+V=about 5 to about 15 on average.

30. A radiation-curable composition according to claim 1, wherein W=1 to about 5 on average and S+V=about 12 on average.

31. A radiation-curable composition according to claim 12, wherein W=1 to about 10 on average and S+V=about 5 to about 15 on average.

32. A radiation-curable composition according to claim 1, wherein W=1 to about 5 on average and S+V=about 12 on average.

33. A radiation-curable composition according to claim 1, wherein said carbon-containing side-chains comprise lower alkyls or alkyl substituted aryls are selected from the group consisting of propyl, butyl, i-butyl, 2-ethylbutyl, pentyl, hexyl, heptyl, octyl, nonyl, decyl, undecyl, dodecyl, tetradecyl, propyl phenyl, butyl phenyl, pentyl phenyl, hexyl phenyl, heptyl phenyl, octyl phenyl and nonyl phenyl.

34. A radiation-curable, inner primary coating composition according to claim 1, wherein said photoinitiator is present in an amount of about 1 to about 20% by weight, based on the total weight of the inner primary composition.

35. A radiation-curable, inner primary coating composition according to claim 1, wherein said photoinitiator is present in an amount of about 1 to about 10% by weight, based on the total weight of the inner primary composition.

36. A radiation-curable, inner primary coating composition according to claim 12, wherein said carbon-containing side-chains comprise lower alkyls or alkyl substituted aryls are selected from the group consisting of propyl, butyl, i-butyl, 2-ethylbutyl, pentyl, hexyl, heptyl, octyl, nonyl, decyl, undecyl, dodecyl, tetradecyl, propyl phenyl, butyl phenyl, pentyl phenyl, hexyl phenyl, heptyl phenyl, octyl phenyl and nonyl phenyl.

37. A radiation-curable, inner primary coating composition according to claim 6, wherein said photoinitiator is present in an amount of about 1 to about 10% by weight, based on the total weight of the inner primary composition.

38. A radiation-curable, inner primary coating composition according to claim 12, wherein said photoinitiator is present in an amount of about 1 to about 20% by weight, based on the total weight of the inner primary composition.

39. A radiation-curable, inner primary coating composition according to claim 12, wherein said photoinitiator is present in an amount of about 1 to about 10% by weight, based on the total weight of the inner primary composition.

40. A radiation-curable, inner primary coating composition according to claim 1, wherein said radiation-curable releasing oligomer is present in an amount of from about 1 to about 99%, said photoinitiator is present in an amount of from about 1 to about 20% by weight, and said diluent monomer is present in an amount of from about 5 to about 70% by weight, all weight % based on the total weight of the inner primary coating composition.

41. A radiation-curable, inner primary coating composition according to claim 1, wherein said radiation-curable releasing oligomer is present in an amount of from about 1 to about 99%, said photoinitiator is present in an amount of from about 1 to about 20% by weight, and said diluent monomer is present in an amount of from about 10 to about 60% by weight, all weight % based on the total weight of the inner primary coating composition.

42. A radiation-curable, inner primary coating composition according to claim 1, wherein said radiation-curable releasing oligomer is present in an amount of from about 1 to about 99%, said photoinitiator is present in an amount of from about 1 to about 20% by weight, and the inner primary coating composition includes at least one other radiation-curable oligomer or diluent monomer in an amount of from about 1 to about 90% by weight and at least one release agent present in an amount of from about 0.1 to about 5 weight %, all weight % based on the total weight of the inner primary coating composition.

43. A radiation-curable, inner primary coating composition according to claim 12, wherein said radiation-curable releasing oligomer is present in an amount of from about 1 to about 99%, said photoinitiator is present in an amount of from about 1 to about 20% by weight, and said diluent monomer is present in an amount of from about 5 to about 70% by weight, all weight % based on the total weight of the inner primary coating composition.

44. A radiation-curable, inner primary coating composition according to claim 12, wherein said radiation-curable releasing oligomer is present in an amount of from about 1 to about 99%, said photoinitiator is present in an amount of from about 1 to about 20% by weight, and said diluent monomer is present in an amount of from about 10 to about 60% by weight, all weight % based on the total weight of the inner primary coating composition.

45. A radiation-curable, inner primary coating composition according to claim 12, wherein said radiation-curable releasing oligomer is present in an amount of from about 1 to about 99%, said photoinitiator is present in an amount of from about 1 to about 20% by weight, and the inner primary coating composition includes at least one other radiation-curable oligomer or diluent monomer in an amount of from about 1 to about 90% by weight and at least one release agent present in an amount of from about 0.1 to about 5 weight %, all weight % based on the total weight of the inner primary coating composition.

46. A radiation-curable composition according to claim 1, wherein said releasing oligomer comprises:

where HA=hydroxyethyl acrylate,

I=isophorone diisocyanate; and

Poly(HSA) is represented by the following formula where x+y=about 12 on average.

47. A radiation-curable according to claim 12, wherein said releasing oligomer comprises:

where HA=hydroxyethyl acrylate,

I=isophorone diisocyanate; and

Poly(HSA) is represented by the following formula where x+y=about 12 on average.

* * * * *